(12) United States Patent
Nazzaro et al.

(10) Patent No.: US 10,970,006 B1
(45) Date of Patent: Apr. 6, 2021

(54) MULTI-FUNCTION DEVICES WITH PERSONALIZED HOME SCREEN AND SAVED JOBS FOR AUTHENTICATED USER

(71) Applicant: Xerox Corporation, Norwalk, CT (US)

(72) Inventors: Cheryl A. Nazzaro, Fairport, NY (US); Sanja Pstrocki-Porras, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/668,965

(22) Filed: Oct. 30, 2019

(51) Int. Cl.
*G06F 3/12* (2006.01)
*H04N 1/00* (2006.01)
*H04N 1/44* (2006.01)

(52) U.S. Cl.
CPC .......... *G06F 3/1204* (2013.01); *G06F 3/1257* (2013.01); *H04N 1/00395* (2013.01); *H04N 1/00437* (2013.01); *H04N 1/00514* (2013.01); *H04N 1/4426* (2013.01); *G06F 3/1288* (2013.01)

(58) Field of Classification Search
CPC .... G06F 3/1204; G06F 3/1257; G06F 3/1288; H04N 1/00437; H04N 1/00395; H04N 1/00514; H04N 1/4426

USPC ......................................................... 358/1.13
See application file for complete search history.

(56) References Cited

U.S. PATENT DOCUMENTS

| | | | |
|---|---|---|---|
| 7,202,962 B2 * | 4/2007 | Roosen | H04N 1/00204 358/1.15 |
| 9,367,337 B1 | 6/2016 | Eilam | |
| 2009/0046306 A1 * | 2/2009 | Green | H04N 1/00137 358/1.9 |
| 2009/0070404 A1 * | 3/2009 | Mazzaferri | G06F 3/0484 709/202 |
| 2019/0361632 A1 * | 11/2019 | Hosoda | G06F 3/1293 |
| 2020/0034090 A1 * | 1/2020 | Iida | G06F 3/127 |

* cited by examiner

*Primary Examiner* — Tammy Paige Goddard
*Assistant Examiner* — Darryl V Dottin (57) ABSTRACT

A method for executing a saved job from a remotely located multi-function device (MFD) is disclosed. For example, the method is executed by a processor and includes authenticating a user, accessing a saved job from an application server, wherein the saved job was created from a local MFD, setting a plurality of parameters on the remotely located MFD based on metadata obtained from the saved job, and executing the saved job on the remotely located MFD.

10 Claims, 5 Drawing Sheets

MULTI-FUNCTION DEVICES WITH PERSONALIZED HOME SCREEN AND SAVED JOBS FOR AUTHENTICATED USER

The present disclosure relates generally to multi-function devices (MFDs) and relates more particularly to MFDs that have personalized home screens and saved jobs that can be accessed from another remotely located MFD.

BACKGROUND

Multi-function devices (MFDs) can be used to perform a variety of different functions. For example, MFDs can be used to copy documents, print documents, fax documents, and the like. Typically, a user may have a computing device that is communicatively coupled to the MFD. The user may create an image to be printed on the computing device and send the image data to the MFD to be printed.

At a later time, the user may travel to a second location and want to print the same image. However, the user would need to bring his or her computing device to the second location and connect to the remotely located MFD to print the image at the second location.

SUMMARY

According to aspects illustrated herein, there are provided a method, non-transitory computer readable medium, and an apparatus for executing a saved job from a remotely located multi-function device (MFD). One disclosed feature of the embodiments is a method that authenticates a user, accesses a saved job from an application server, wherein the saved job was created from a local MFD, sets a plurality of parameters on the remotely located MFD based on metadata obtained from the saved job, and executes the saved job on the remotely located MFD.

Another disclosed feature of the embodiments is a non-transitory computer-readable medium having stored thereon a plurality of instructions, the plurality of instructions including instructions which, when executed by a processor, cause the processor to perform an operation that authenticates a user, accesses a saved job from an application server, wherein the saved job was created from a local MFD, sets a plurality of parameters on the remotely located MFD based on metadata obtained from the saved job, and executes the saved job on the remotely located MFD.

Another disclosed feature of the embodiments is an apparatus comprising a processor and a computer readable medium storing a plurality of instructions which, when executed by the processor, cause the processor to perform an operation that authenticates a user, accesses a saved job from an application server, wherein the saved job was created from a local MFD, sets a plurality of parameters on the remotely located MFD based on metadata obtained from the saved job, and executes the saved job on the remotely located MFD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a multi-function device (MFD) that provides personalized home screens and can print saved jobs on remotely located MFDs. As discussed above, MFDs can be used to perform a variety of different functions. However, a user typically connects his or her computing device to the MFD to print saved print jobs. In other words, currently there is no way for print jobs created in a first MFD to be accessed and executed on a second MFD that is remotely located from the first MFD.

The present disclosure provides a system that allows a user to save created jobs on a first MFD to a network or cloud. For example, an application server in communication with a plurality of different MFDs may store a created job. When a user travels to a second geographic location, the user may access the saved job from a second MFD that is part of the network and in communication with the application server. For example, the user may simply log into the second MFD, select the saved job, and have the second MFD execute the saved job.

In other words, the user is not required to bring a computing device to connect to the second MFD. In addition, the user is not required to re-create the job on the second MFD (e.g., make all of the feature selections, such as paper size, color, finishing options, number of copies, and the like). Rather, the user may simply log into the second MFD, be presented with the saved jobs, and select the job to be executed on the second MFD.

In addition, the present disclosure provides personalized home screens. For example, the home screen for the user interface of the MFD may be customized for a particular user. As a result, when a user travels to different locations and accesses different MFDs, the home screen may still be the same for the user.

Figure 1:
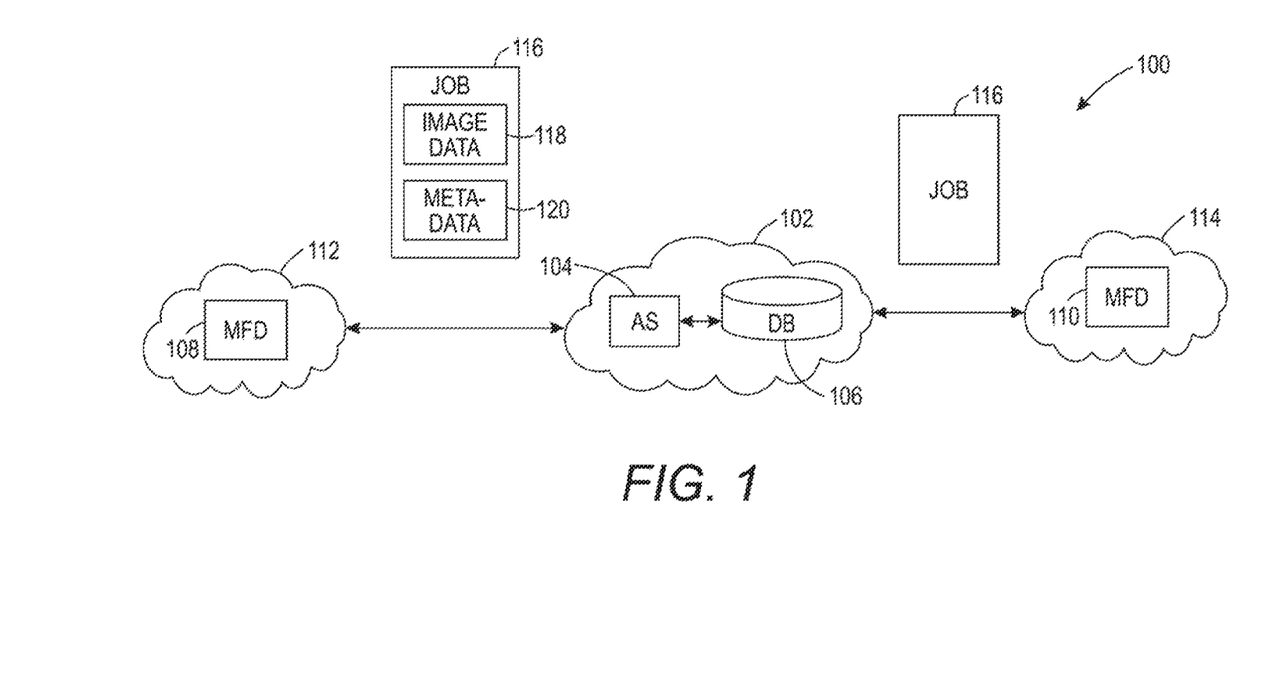
FIG. 1 illustrates a block diagram of a system of the present disclosure.

FIG. 1 illustrates an example system 100 of the present disclosure. In one embodiment, the system 100 may include a communication network 102 that includes an application server (AS) 104 and a database (DB) 106. Although the AS 104 and the DB 106 are illustrated as separate components, it should be noted that the AS 104 and the DB 106 may be deployed as a single device.

In one embodiment, the communication network 102 may be an Internet protocol (IP) network. The communication network 102 may be wide area network (e.g., across different geographic locations) or a local area network (e.g., a wireless network within a building). In one embodiment, references made to "the cloud" may refer to the communication network 102.

It should be noted that the communication network 102 has been simplified for ease of explanation. The communication network 102 may include other devices or components that are not shown. For example, the communication network 102 may include routers, switches, gateways, firewalls, and the like.

The AS 104 may be a computing device that includes a processor and memory. The AS 104 may be communicatively coupled to the DB 106. The DB 106 may include a computer readable storage medium that may store various information or data. For example, DB 106 may store user profiles, user log-in credentials, and the like. In one embodiment, a job 116 created on an MFD 108 (discussed in further details below) may be stored in the AS 104 or the DB 106.

In one embodiment, the AS 104 may be communicatively coupled to local networks 112 and 114. The local networks 112 and 114 may be located in different geographic and/or physical locations. For example, the local network 112 may be a local network for an enterprise office in California and the local network 114 may be a local network for an enterprise in New York. In one embodiment, an MFD 108 may be located in the local network 112 and an MFD 110 may be located in the local network 114.

Although two local networks 112 and 114 are illustrated in FIG. 1, it should be noted that any number of local networks may be communicatively coupled to the communication network 102 and the AS 104. Although a single MFD 108 and 110 are illustrated in the respective local networks 112 and 114, it should be noted that the local networks 112 and 114 may include any number of MFDs.

In one embodiment, the MFD 108 may be referred to as a "local MFD". For example, the MFD 108 may be a local MFD of a user or the MFD that a user interacts with the most. For example, the local network 112 may be where a user works daily.

In one embodiment, a job 116 may be created on the MFD 108. For example, the job 116 may be a print job, an email job for a saved document, and the like. In one embodiment, the job 116 may include image data 118 and metadata 120. The image data 118 may include information regarding what the image is (e.g., color information for each pixel of the image). The metadata 120 may include a plurality of parameters for the MFD to execute the job 116. For example, the parameters may include selections or values for one or more features associated with the job 116.

For example, a user may create a print job on the MFD 108. The print job may include an image of an advertisement with graphics and text. The image may be saved as the image data 118. The user may brighten the image, adjust the color settings of the image, select a paper size, select a number of copies, select a zoom percentage for the image on the selected paper size, choose double sided printing, select a finishing option (e.g., a 3-hole punch on a left side of the page), and the like. The various features and values selected by the user may be saved as the metadata 120. The combination of the image data 118 and the metadata 120 may create the job 116.

In one embodiment, the job 116 may be saved as a page description language (PDL) file, or any other type of printer language file. In contrast, when an MFD receives a job request from a computing device, the MFD may convert the job request into a format that is understandable by the MFD. The present disclosure allows the job 116 to be created and saved in a format that is understood by the MFD 108, or any other MFD (e.g., the MFD 110). As a result, no conversion of the job 116 is required when retrieved and executed, as discussed in further details below. Rather, the MFD 108 or 110 may access the job 116, configure all of the desired parameters for the job 116 from the image data 118 and the metadata 120, and execute the job 116 (e.g., print the document, email the document, and the like).

In one embodiment, the job 116 may be stored in the AS 104 or the DB 106 in the communication network 102. In other words, the job 116 may be stored in the "the cloud". At a later time, the user may travel to the local network 114 that includes the MFD 110. The MFD 110 may be referred to as a "remotely located MFD". Rather than having to recreate the job 116 at the MFD 110, the MFD 110 may establish a communication session with the AS 104 and retrieve the job 116. As a result, the user may access the job 116 at MFD 110 and execute the job 116 on the MFD 110.

In one embodiment, the user may simply select the job 116 that is saved. No other selections or interaction may be necessary on the MFD 110. Rather, the MFD 110 may read the image data 118 and the metadata 120 associated with the job 116 and automatically configure all of the parameters on the MFD 110 and execute the job (e.g., print the document).

In one embodiment, if one or more of the parameters are not available on the MFD 110, a notification may be presented to the user. The notification may provide options to the user to change those parameters or features that are not available on the MFD 110. For example, the user may have created a color image for the job 116 on the MFD 108. However, the MFD 110 may be a black and white only printer. Thus, the MFD 110 may present a notification to the user asking if the user wishes to continue executing the job 116 in black and white rather than color.

Moreover, it should be noted that no additional computing device is used to execute the job at the MFD 110. For example, in previous methods, the user may store a print job on a laptop computer. The user may travel to the MFD 110, connect the laptop computer to the MFD 110, and then execute the print job on the MFD 110. In contrast, the present disclosure allows a user to create the job 116 on a local MFD (e.g., the MFD 108) and execute the job 116 on a remotely located MFD (e.g., the MFD 110) without using an additional computing device.

In addition, the present disclosure may allow a user to personalize a home screen that is presented to the user on the MFDs 108 and 110. For example, even though the MFDs 108 and 110 may be in different locations and different companies, the MFDs 108 and 110 may still present the same personalized home screen to the user. As a result, the user may quickly create the job 116, save the job 116, find the job 116, and the like using any MFD at any location.

In one embodiment, the personalized home screen may be saved in the AS 104 and/or the DB 106. As a result, any MFD that is communicatively coupled to the AS 104 may obtain the personalized home screen for the user. For example, after the user logs into an MFD and is authenticated, the AS 104 may transmit the personalized home screen to the MFD to be displayed to the user.

Figure 2:
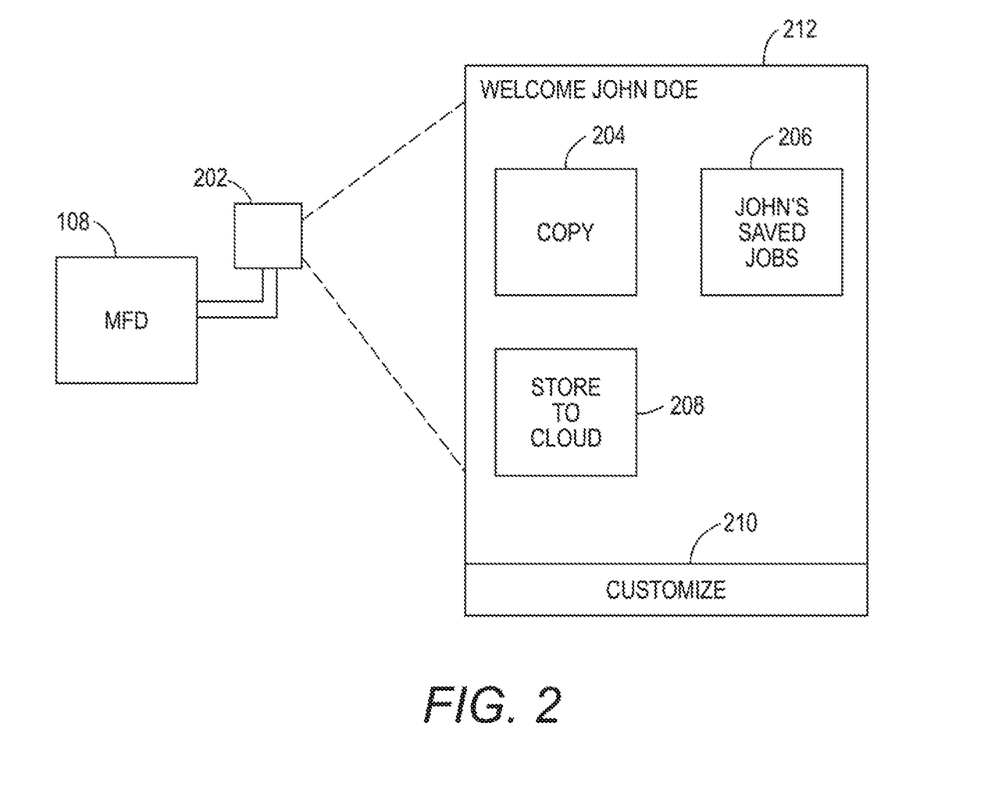
FIG. 2 illustrates an example screenshot of the personalized home screen on the MFD of the present disclosure.

FIG. 2 illustrates an example screenshot of a personalized home screen 212 of a user. For example, the MFD 108 (and similar for the MFD 110) may include a display 202. The display 202 may present a user interface. The user interface may be a graphical user interface (GUI). The display 202 may be touch screen or the MFD 108 may include input devices (e.g., a keypad, a trackpad, a mouse, and the like) to move a cursor around the GUI.

After a user logs into the MFD 108 and is authenticated, the MFD 108 may present the personalized home screen 212 for the user. The personalized home screen 212 may include selected applications and menus that are represented as icons 204, 206, and 208. The personalized home screen 212 may also include a customize option 210.

In one embodiment, the customize option 210 may allow a user to select the applications or menus to be displayed on the personalized home screen 212. In addition, the customize option 210 may allow a user to personalized how information is displayed within each application. The customize option 210 may also allow a user to customize the appearance of the personalized home screen (e.g., a background image, color combinations, font size, how the icons 204, 206, and 208 are arranged, and the like).

For example, a user may choose a copy application as shown by the icon 204, saved jobs menu as shown by an icon 206, and a store to cloud application 208. Other users may include different applications. For example, a second user may prefer to have an email application, saved jobs menu, store to cloud application and an email documents application. Thus, the personalized home screen 212 may appear different for different users on the same MFD 108.

After the personalized home screen 212 is created on the MFD 108, the personalized home screen 212 may be presented on any remotely located MFD that the user logs into. For example, when the user travels to a location that includes the MFD 110 the user may log in and be authenticated on the MFD 110. In response, the MFD 110 may receive the personalized home screen 212 of the user from the AS 104 and present the personalized home screen 212 to the user.

In one embodiment, the personalized home screen 212 may be transmitted as a configuration file that is executed and presented on the MFD 110. In one embodiment, the personalized home screen 212 may be presented as a remote session via the AS 104. For example, the MFD 110 may simply display the images generated by the AS 104 and transmitted to the MFD 110 over a network connection between the MFD 110 and the AS 104.

Figure 3:
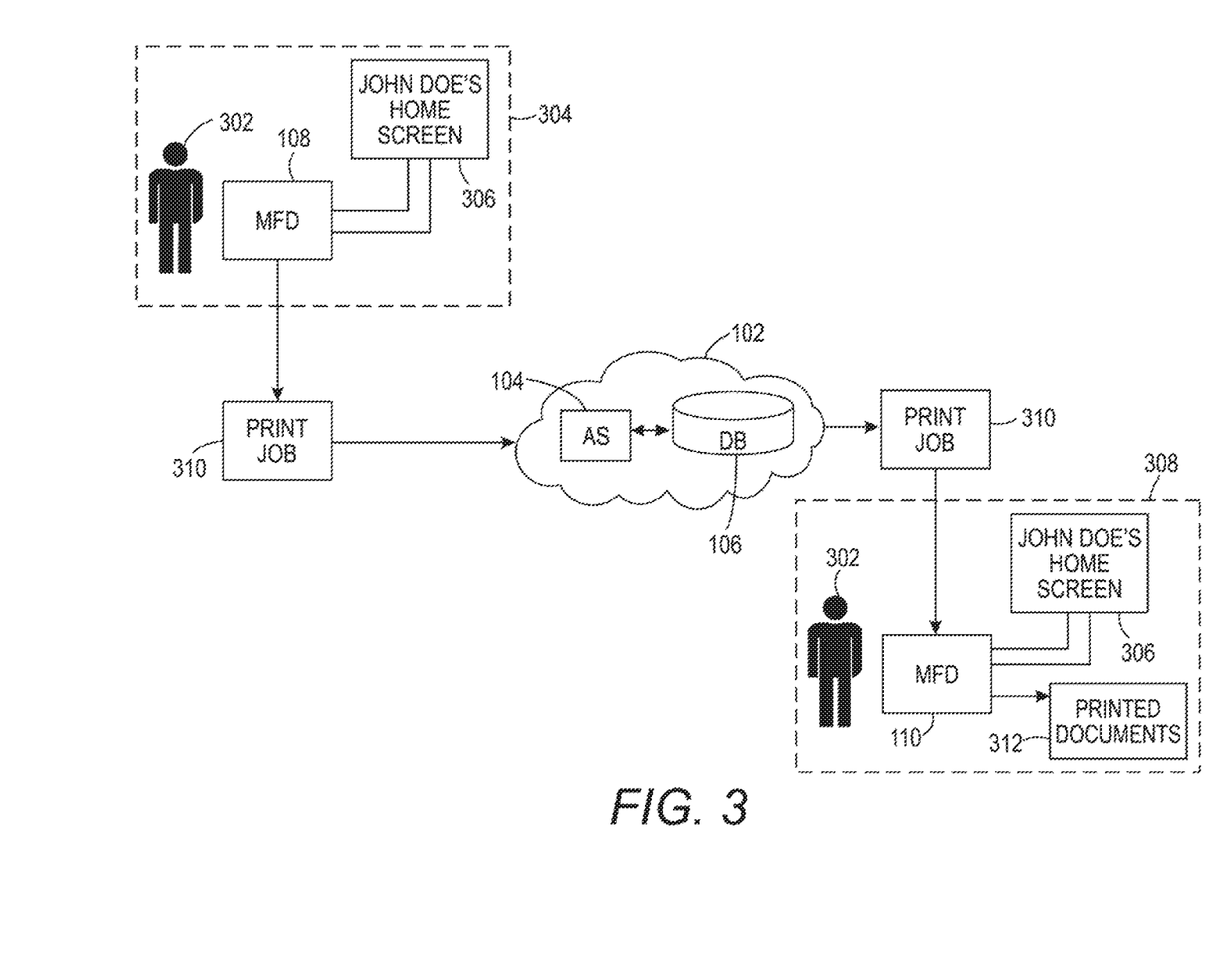
FIG. 3 illustrates an example of a user accessing saved jobs from the cloud on two different MFDs.

FIG. 3 illustrates an example of a user accessing saved jobs from the cloud on two different MFDs. In one embodiment, a user 302 may be at a home office location 304 that includes the MFD 108. The user 302 may create a personalized home screen 306 on the MFD 108. The personalized home screen 306 may be stored in the AS 104, as described above.

The user 302 may be travelling to a remote location 308 that includes the MFD 110. The user 302 may want to create a print job 310 at the MFD 108 that the user 302 may want to distribute at the remote location 308. In one embodiment, the user 302 may create the print job 310 on the MFD 108 at the home location 304. The user may select the images, the layout of the images, an adjusted size of the images, colors of the images, values for color adjustments, values for brightness adjustments, a number of copies, a paper size, double sided printing, collating the printed images, and the like. The selections for the various features of the print job 310 may be stored as image data and metadata, as described above.

In one embodiment, the print job 310 may be stored in a format that is understood by the MFD 110. For example, the print job 310 may be stored in a PDL format. Thus, when the print job 310 is accessed from the remote location 308 on the MFD 110, no further conversion of the print job 310 may be necessary.

At a later time, the user 302 may travel to the remote location 308. The user may log into the MFD 110. The MFD 110 may authenticate the user 302. For example, the user 302 may enter a username and password on the GUI of the MFD 110 or swipe an access card on a card reader of the MFD 110. The user credentials may be transmitted to the AS 104 and the AS 104 may compare the credentials to stored credential information for different users. If a match is found, the AS 104 may send a signal to the MFD 110 that the user is authenticated. In response to being authenticated, the MFD 110 may also present the personalized home screen 306 on a display of the MFD 110 to the user 302.

In one embodiment, the user 302 may find the saved job or saved print job 310 via menus on the personalized home screen 306. When the user 302 selects the saved print job 310, the print job 310 may be transmitted from the AS 104 to the MFD 110. The MFD 110 may then process the print job 310 to automatically configure various parameters in accordance with the selections and values found in the image data and metadata associated with the print job 310.

Notably, no additional conversion of the print job 310 may be performed by the MFD 110. In addition, the user 302 may access the print job 310 directly from the MFD 110 without any additional computing devices. In other words, the user is not accessing a saved file from a laptop computer, sending the file to the MFD 110, converting the file into the PDL, and then printing the file on the MFD 110. Rather, the user 302 may simply select the print job 310 stored in the cloud and have the MFD 110 automatically configure the parameters and generate printed documents 312.

As a result, the present disclosure allows a user to create jobs locally on an MFD and store the jobs in the cloud. The user may then access the saved jobs from any other remotely located MFD that is also connected to the cloud. The user may easily access and execute the saved jobs using a personalized home screen on any MFD that the user is logged into. Moreover, the MFD may automatically configure itself to execute the saved jobs based on information in the saved jobs. Thus, a user is not required to re-enter all of the selections and values for different parameters or features associated with the job at the remotely located MFD. The ability to easily access and execute saved jobs stored in the cloud on any remotely located MFD may provide a more efficient user experience.

Figure 4:
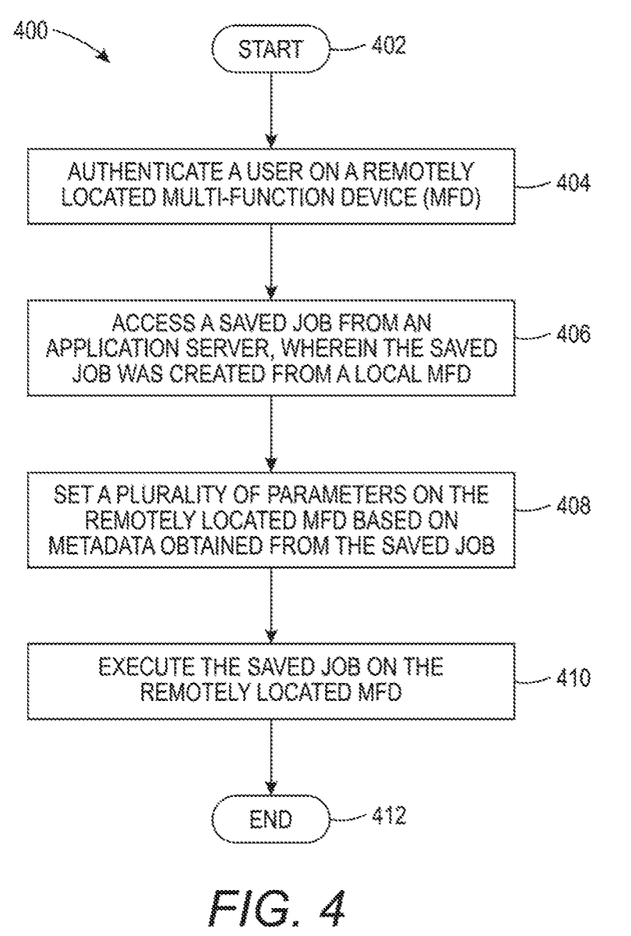
FIG. 4 illustrates a flowchart of an example method for executing a saved job from a remotely located MFD of the present disclosure.
Figure 5:
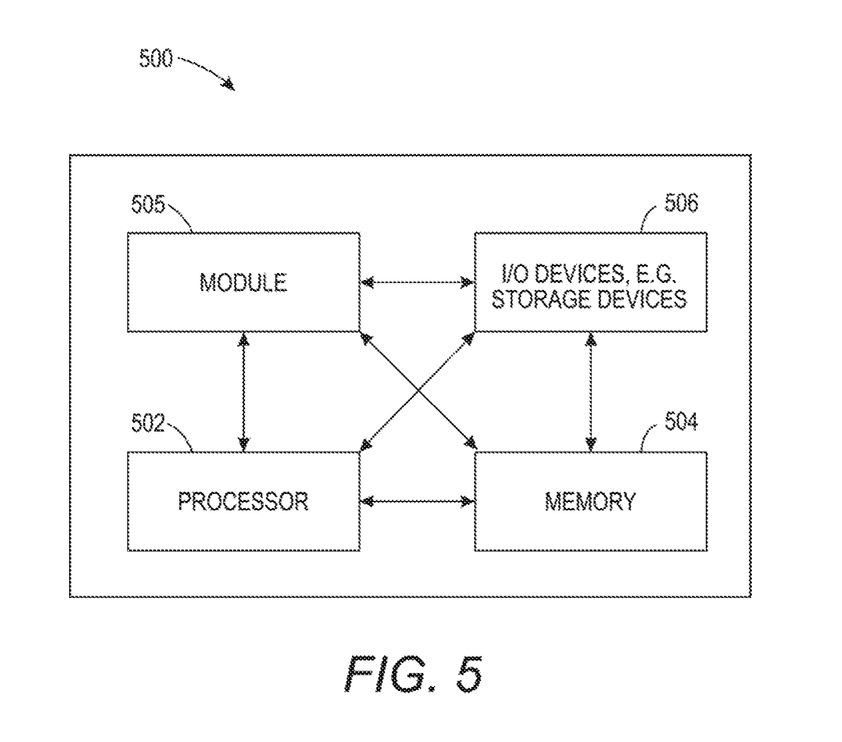
FIG. 5 illustrates a high-level block diagram of an example computer suitable for use in performing the functions described herein.

FIG. 4 illustrates a flowchart of an example method 400 for executing a saved job from a remotely located MFD of the present disclosure. In one embodiment, one or more blocks of the method 400 may be performed by the AS 104, the MFD 108, or a computer/processor that controls operation of an MFD as illustrated in FIG. 5 and discussed below.

At block 402, the method 400 begins. At block 404, the method 400 authenticates a user on the remotely located MFD. For example, a user may have a home office location where the user mainly interacts with a local MFD. The user may temporarily travel to a different geographic location, another building, another office location, and the like, that includes the remotely located MFD. The remotely located MFD and the local MFD may be part of a common communication network that includes an application server and/or database as part of the "the cloud."

In one embodiment, the user may swipe an identification card or enter a username/password combination on the MFD to be authenticated. The user may be authenticated locally by the remotely located MFD, or the user credentials may be transmitted to the application server in the cloud for authentication.

In one embodiment, after the user is authenticated on the remotely located MFD, a personalized home screen may be presented to the user on the display. The personalized home screen may include user selected applications and menus that were created on the local MFD. As a result, the user may easily find the desired applications and files on any MFD that the user may log into.

At block 406, the method 400 accesses a saved job from an application server. In one embodiment, the user may create a job on the local MFD. The job may be a print job, an email job to send a document to different recipients, and the like. The saved job may include image data and metadata. The image data may include information regarding how the image and/or text should appear. The metadata may include information regarding various settings and values for different parameters that can be selected on the remotely MFD. For example, the parameters may include color, brightness, finishing options, paper size, zoom percentage, and the like.

In one embodiment, after the user creates the job, the job may be saved in the cloud (e.g., in the application server). The saved job may be saved in a format that can be understood by the remotely located MFD. For example, the saved job may be saved in a PDL format. As a result, no conversion of the file is necessary when the remotely located MFD accesses the saved job.

At block 408, the method 400 sets a plurality of parameters on the remotely located MFD based on metadata obtained from the saved job. For example, the meta data in the saved job may be used to automatically configure the remotely located MFD to execute the saved job. Said another way, the user may simply select the saved job from the application server on a user interface of the remotely located MFD. After the saved job is selected, the remotely located MFD may receive the saved job, read the image data and meta data, and automatically configure itself to execute the job.

For example, for a print job, the remotely located MFD may set all of the parameters selected by the user and found in the meta data. The remotely located MFD may set the number of copies, the paper size, any adjustments to the image (e.g., color, brightness, shading, re-sizing, zoom, and the like), any bordering, finishing options (e.g., stapling, three-hole punch, location of the hole punch, collating, and the like), and so forth. Said another way, after the user selects the saved job, the user may not need to press another button or make any additional selections to execute the saved job.

In one embodiment, if some of the parameters selected by the user are not available on the remotely located MFD, a notification may be presented to the user on the display or user interface of the MFD. The notification may include the features or parameters that are not available and/or alternative options. For example, the image data may call for a color image, but the remotely located MFD may only print in black and white. The notification may indicate that color is not available and ask the user if she or he would like to continue to print the image in black and white.

In another example, the meta-data may call for a particular paper size. However, the particular paper size may not be available on the remotely located MFD. The notification may provide a list of available paper sizes on the remotely located MFD and may allow the user to select a different paper size to execute the saved job.

At block 410, the method 400 executes the saved job on the remotely located MFD. For example, the remotely located MFD may print, email, and the like, the saved job. At block 412, the method 400 ends.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for executing a saved job from a remotely located MFD, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for executing a saved job from a remotely located MFD (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for executing a saved job from a remotely located MFD (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for executing a saved job from a remotely located multi-function device (MFD), comprising:

creating a print job on a local MFD, wherein the print job is saved as a page description language (PDL) file that comprises image data and meta data, wherein the metadata comprises a plurality of selections for a plurality of print settings made by a user;

transmitting the PDL file to an application server in a communication network to be stored in the application server, wherein the application server is communicatively coupled to the local MFD and the remotely located MFD;

authenticating the user on the remotely located MFD;

presenting on a user interface of the remotely located MFD the print job created by the user that is saved in the application server;

receiving a selection of the print job;

receiving the PDL file associated with the print job from the application server in response to the print job that is selected at the remotely located MFD;

configuring the remotely located MFD in accordance with the plurality of selections for the plurality of print settings obtained in the metadata of the the PDL file; and executing the print job on the remotely located MFD.

2. The method of claim 1, further comprising:

providing a personalized home screen on the user interface of the remotely located MFD in response to the authenticating.

3. The method of claim 2, wherein the personalized home screen is created on the local MFD.

4. The method of claim 2, wherein the personalized home screen comprises user selected applications.

5. The method of claim 2, wherein the personalized home screen comprises user selected menus.

6. A non-transitory computer-readable medium storing a plurality of instructions, which when executed by a processor of a remotely located multi-function device (MFD), cause the processor to perform operations for executing a saved job from the remotely located MFD, the operations comprising:

creating a print job on a local MFD, wherein the print job is saved as a page description language (PDL) file that comprises image data and meta data, wherein the metadata comprises a plurality of selections for a plurality of print settings made by a user;

transmitting the PDL file to an application server in a communication network to be stored in the application server, wherein the application server is communicatively coupled to the local MFD and the remotely located MFD;

authenticating the user on the remotely located MFD;

presenting on a user interface of the remotely located MFD the print job created by the user that is saved in the application server;

receiving a selection of the print job;

receiving the PDL file associated with the print job from the application server in response to the print job that is selected at the remotely located MFD;

configuring the remotely located MFD in accordance with the plurality of selections for the plurality of print settings obtained in the metadata of the the PDL file; and executing the print job on the remotely located MFD.

7. The non-transitory computer-readable medium of claim 6, further comprising:

providing a personalized home screen on the user interface of the remotely located MFD in response to the authenticating.

8. The non-transitory computer-readable medium of claim 7, wherein the personalized home screen is created on the local MFD.

9. The non-transitory computer-readable medium of claim 7, wherein the personalized home screen comprises user selected applications.

10. The non-transitory computer-readable medium of claim 7, wherein the personalized home screen comprises user selected menus.

* * * * *